US008743686B2

(12) United States Patent
Zhou et al.

(10) Patent No.: US 8,743,686 B2
(45) Date of Patent: Jun. 3, 2014

(54) METHOD, DEVICE, AND SYSTEM FOR ADMISSION CONTROL IN METROPOLITAN AREA NETWORK

(75) Inventors: Qian Zhou, Shenzhen (CN); Ting Zou, Shenzhen (CN); Fuqing Huang, Shenzhen (CN); Jianqun Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 13/086,957

(22) Filed: Apr. 14, 2011

(65) Prior Publication Data

US 2011/0188374 A1 Aug. 4, 2011

Related U.S. Application Data

(63) Continuation of application No. PCT/CN2009/073065, filed on Aug. 4, 2009.

(30) Foreign Application Priority Data

Oct. 15, 2008 (CN) .......................... 2008 1 0199175

(51) Int. Cl.
*H04L 12/26* (2006.01)
*H04J 3/18* (2006.01)

(52) U.S. Cl.
USPC .......................................... 370/232; 370/477

(58) Field of Classification Search
USPC .................. 370/468, 477, 230–236
See application file for complete search history.

(56) References Cited

U.S. PATENT DOCUMENTS

| 7,257,640 | B1 * | 8/2007 | Callocchia et al. | 709/233 |
|---|---|---|---|---|
| 2003/0165141 | A1 | 9/2003 | Hagsand et al. | |
| 2006/0159084 | A1 * | 7/2006 | Shimizu et al. | 370/389 |
| 2007/0025246 | A1 * | 2/2007 | Pirzada et al. | 370/230 |
| 2008/0049746 | A1 * | 2/2008 | Morrill et al. | 370/389 |
| 2008/0080374 | A1 * | 4/2008 | Nuzman et al. | 370/230 |

(Continued)

FOREIGN PATENT DOCUMENTS

| CN | 101188554 A | 5/2008 |
|---|---|---|
| CN | 101282297 A | 10/2008 |

(Continued)

OTHER PUBLICATIONS

Written Opinion of the International Searching Authority issued in corresponding PCT Patent Application No. PCT/CN2009/073065, mailed Nov. 12, 2009.

(Continued)

*Primary Examiner* — Paul H Masur
(74) *Attorney, Agent, or Firm* — Brinks Gilson & Lione

(57) ABSTRACT

A method comprises converging resource reservation requests from users, wherein the resource reservation requests contain bandwidth values to be occupied for data transmission; determining a total bandwidth value comprising a sum of the bandwidth values to be occupied for data transmission in the converged resource reservation requests; determining the total bandwidth value is larger than a preset bandwidth threshold of a first transmission path having an identifier (ID) number; and establishing a second transmission path using the identifier (ID) number of the first transmission path distributed to the users, wherein an ID number of the second transmission path is the ID number of the first transmission path and a bandwidth value of the second transmission path is larger than or equal to the total bandwidth value.

2 Claims, 3 Drawing Sheets

(56) References Cited

U.S. PATENT DOCUMENTS

| | | | | |
|---|---|---|---|---|
| 2008/0219268 | A1* | 9/2008 | Dennison | 370/395.2 |
| 2010/0241747 | A1* | 9/2010 | Guo et al. | 709/225 |
| 2011/0222405 | A1* | 9/2011 | Bugenhagen | 370/235 |
| 2011/0249554 | A1* | 10/2011 | Chamas et al. | 370/230 |

FOREIGN PATENT DOCUMENTS

| | | |
|---|---|---|
| CN | 101488900 A | 7/2009 |
| CN | 101557303 A | 10/2009 |
| CN | 101577932 A | 11/2009 |
| WO | WO 2008/002298 A1 | 1/2008 |
| WO | WO 2008/039387 A1 | 4/2008 |
| WO | WO 2009/094923 A1 | 8/2009 |

OTHER PUBLICATIONS

International Search Report issued in corresponding PCT Patent Application No. PCT/CN2009/073065, mailed Nov. 12, 2009.
ETSI, "Telecommunications and Internet Converged Services and Protocols for Advanced Networking (TISPAN); Resource and Admission Control Sub-System (RACS); Functional Architecture", ETSI ES 282 003, V3.3.2, Jun. 2009.
ETSI, "Telecommunications and Internet Converged Services and Protocols for Advanced Networking (TISPAN); Resource and Admission Control Sub-System (RACS); Functional Architecture", ETSI ES 282 003, Jun. 2009.
ETSI, "Telecommunications and Internet Converged Services and Protocols for Advanced Networking (TISPAN); Resource and Admission Control Sub-System (RACS); Functional Architecture", ETSI ES 282 003, V3.1.2, Sep. 2008.
ETSI, Portugal Telecom, "WI02072—Output draft v3.3.2 on RACS R3 stage 2", ETSI TISPAN#21-WGs. Sophia Antipolis, Jun. 8-11, 2009. 21WTD055.
Extended European Search Report issued in corresponding European Patent Application No. 09820207.0, mailed Nov. 23, 2011.
Ash et al., "LSP Modification Using CR-LDP" Network Working Group, Jan. 2002.
Kankkunen et al., "VoIP over MPLS Framework" Internet Engineering Taskforce, Jul. 2000.
Office Action issued in corresponding Chinese Patent Application No. 200810199175.4, mailed Jan. 11, 2012.
Office Action issued in corresponding European Patent Application No. 09820207.0, mailed Aug. 15, 2013, 4 pages.

* cited by examiner

METHOD, DEVICE, AND SYSTEM FOR ADMISSION CONTROL IN METROPOLITAN AREA NETWORK

CROSS-REFERENCE TO RELATED APPLICATIONS

This application is a continuation of International Application No. PCT/CN2009/073065, filed on Aug. 4, 2009, which claims priority to Chinese Patent Application No. 200810199175.4, filed on Oct. 15, 2008, both of which are hereby incorporated by reference in their entireties.

FIELD OF THE TECHNOLOGY

The present invention relates to the field of communication technology, and more particularly to a method, device, and system for admission control in Metropolitan Area Network (MAN).

BACKGROUND OF THE INVENTION

In the current network transmission technology, in order to guarantee the quality of service (QoS) of a multi-service network, a method for dynamically establishing a service path is establishing the path automatically and managing network resources dynamically through the coordination between a resource manager (RM) (that is, a resource admission control system (RACS) or a resource admission control function (RACF)) and a path computation element (PCE) or a control plane. The RM issues a path establishment request carrying service information to trigger the control plane to establish a new service path using a different identifier (ID) number for a user according to the service information. However, the method involves complicated algorithms, and the RM interacts directly with the PCE/control plane, making the network resources uncontrollable from the perspective of operation and maintenance.

The current technical solution described above establishes a label switched path (LSP) only based on the admission control over a session, which establishes a new LSP through the result of PCE computation for every session request, that is, different IDs are used to establish new LSPs. For an individual subscriber line, it is unrealistic to use a different ID number every time a new LSP is established. Moreover, when data of a user is sent through the LSP with a new ID number, besides newly requested services that need to go through the LSP with the new ID number, services that used to go through the LSP with an original ID number also need to be switched to the LSP with the new ID number. For example, assume that a user can only communicate with a server through an LSP having a bandwidth of 2 M and an ID number of 10, when data sent by the user need to be transmitted through an LSP having a bandwidth of more than 2 M, a new LSP having a bandwidth of 4 M and an ID number of 11 must be established; since packets originally are sent by the user through the LSP with the ID number of 10 by default, and may not automatically identify and go through the LSP having the bandwidth of 4 M and the ID number of 11, the system has to switch the original services to the LSP with the ID number of 11; however, the switching may lead to a lack of LSP resources in channels, resulting in problems of service loss, delay, and disorder during the switching process, and the QoS of the transmission is affected.

SUMMARY OF THE INVENTION

The present invention is directed to a method, device, and system for admission control in a MAN, capable of coordinating the dynamic admission control over sessions and the technology of admission control transport network based on convergence, converging resource reservation requests from users for occupying a bandwidth of a transmission path, and dynamically adjusting the bandwidth of the transmission path in the MAN, so as to effectively utilize the resources of the MAN, and ensure the QoS of the transmission thereof.

In an embodiment, the present invention provides a method for admission control in a MAN, which includes:

converging resource reservation requests from users, in which the resource reservation requests contain bandwidth values to be occupied for data transmission; and determining whether a total bandwidth value in the converged resource reservation requests is larger than a preset bandwidth threshold of a transmission path; if yes, establishing a new transmission path using an ID number of the transmission path distributed to the users, in which a bandwidth value of the newly established transmission path is larger than the total bandwidth value in the converged resource reservation requests, and the total bandwidth value is a sum of the bandwidth values to be occupied for data transmission in the converged resource reservation requests.

In an embodiment, the present invention provides an RM, which includes:

a converging unit, configured to converge resource reservation requests from users, in which the resource reservation requests contain bandwidth values to be occupied;

a determining unit, configured to determine whether a total bandwidth value in the converged resource reservation requests is larger than a preset bandwidth threshold of a transmission path; and a determining and processing unit, configured to, when it is determined that the total bandwidth value in the converged resource reservation requests is larger than the preset bandwidth threshold of the transmission path, control to establish a new transmission path using an ID number of the transmission path distributed to the users, in which a bandwidth value of the newly established transmission path is larger than the total bandwidth value in the converged resource reservation requests, and the total bandwidth value is a sum of the bandwidth values to be occupied for data transmission in the converged resource reservation requests.

In an embodiment, the present invention provides a system for admission control in a MAN, which includes:

an RM, configured to converge resource reservation requests from users, and determine whether a total bandwidth value in the converged resource reservation requests is larger than a preset bandwidth threshold of a transmission path; if yes, establish a new transmission path using an ID number of the transmission path distributed to the users, in which a bandwidth value of the newly established transmission path is larger than the total bandwidth value in the converged resource reservation requests, and the total bandwidth value is a sum of bandwidth values to be occupied for data transmission in the converged resource reservation requests; and a path manager, configured to be connected to the RM, receive control signals sent by the RM, and configure new network element parameters of the newly established transmission path according to the control signals.

In the embodiments of the present invention, the RM converges the resource reservation requests from the users, and determines whether the total bandwidth value in the resource reservation requests is larger than the preset bandwidth threshold; if yes, controls to dynamically adjust the bandwidth of the transmission path by keeping the ID number of the original transmission path. As such, it is not necessary for the system to establish a new LSP for every user session request for service transmission, thereby avoiding problems of service loss, delay, and disorder during the service switching process, the resources of the MAN are effectively utilized, and the QoS of the transmission thereof is ensured. Meanwhile, service providers may purchase network resources as needed, and network providers may utilize a convergence-based admission control scheme in the MAN to serve more service providers under the same network architecture, thereby ensuring high capacity of a transport network, and decreasing burden of the network.

DETAILED DESCRIPTION OF THE EMBODIMENTS

In order to make the present invention more comprehensible, the present invention is described in further detail below with reference to the accompanying drawings; however, embodiments in the accompanying drawings shall not impose any limit to the present invention.

Figure 1:
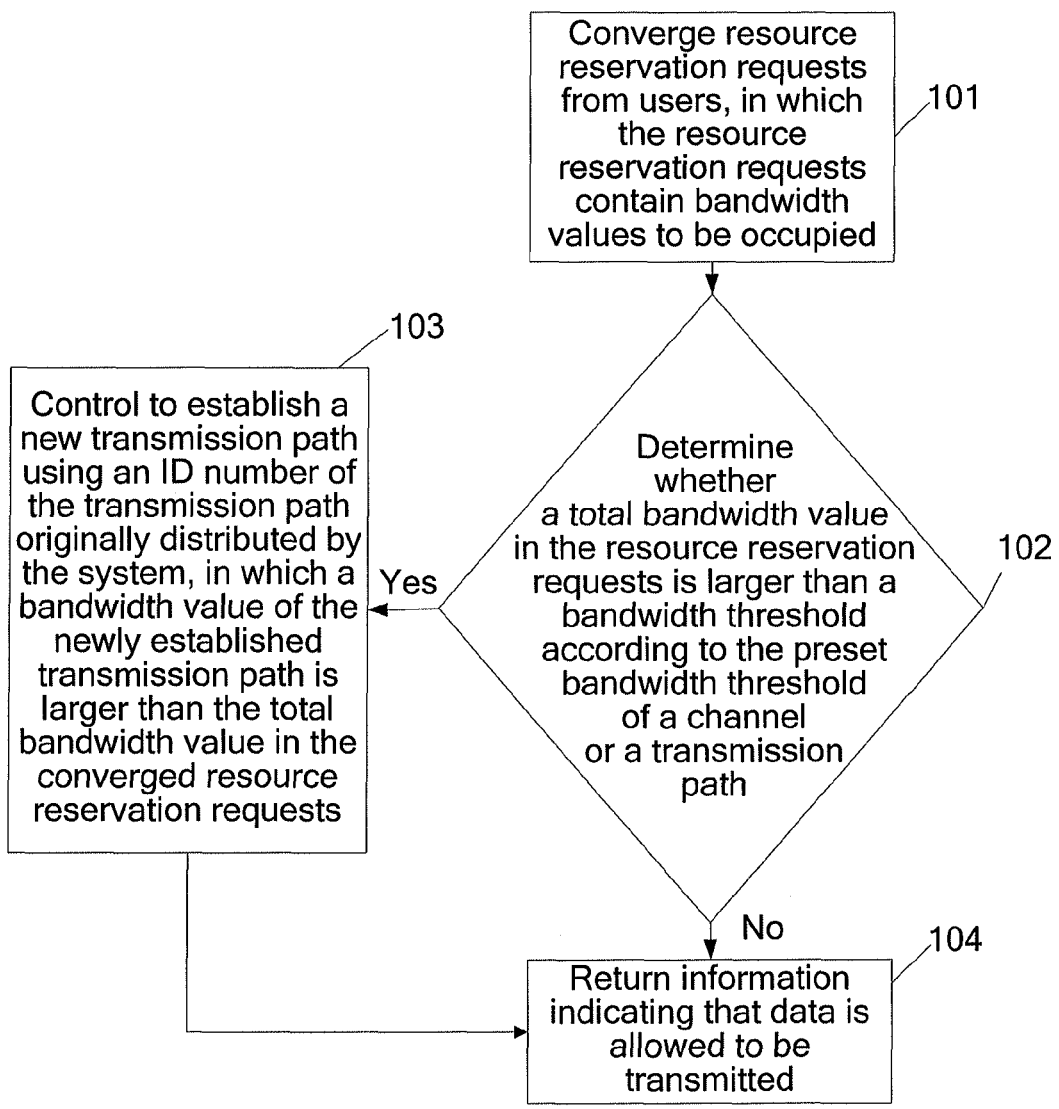
FIG. 1 is a flow chart of a method for admission control in a MAN according to a first embodiment of the present invention.

FIG. 1 shows a first embodiment of a method for admission control in a MAN according to the present invention, which includes the following steps.

101: An RM converges resource reservation requests from users, in which the resource reservation requests contain bandwidth values to be occupied for data transmission.

Each user sends a resource reservation request to the RM according to a size of data to be transmitted, and requires the RM to distribute a transmission path. The RM converges these resource reservation requests, distributes a transmission path in a channel to the users according to the resource reservation requests after negotiating with the network side, and obtains an ID number corresponding to the transmission path.

102: The RM determines whether a total bandwidth value in the converged resource reservation requests is larger than a preset bandwidth threshold of the transmission path.

The total bandwidth value is a sum of bandwidth values to be occupied for data transmission in the converged resource reservation requests.

A channel includes several transmission paths, and a bandwidth threshold of the transmission path may be preset according to a dynamic adjustment policy. For example, a bandwidth of a channel is 100 M, and three LSPs are provided in the channel, in which a bandwidth of an LSP with an ID number of 1 is 10 M, a bandwidth of an LSP with an ID number of 2 is 20 M, and a bandwidth of an LSP with an ID number of 3 is 50 M. A bandwidth threshold of the transmission path may be set according to the LSP having the largest bandwidth, for example, to 50 M, which is the same as the bandwidth of the LSP with the ID number of 3; and the bandwidth threshold may also be set according to a total bandwidth value of several LSPs, for example, to 70 M.

When the bandwidth threshold is set to 50 M, a user A needs to send data of 10 M through the transmission path with the ID number of 3, and at the same time, a user B needs to send data of 50 M through the transmission path with the ID number of 3. In this case, it is determined that the total bandwidth value in the resource reservation requests from the users is larger than the preset bandwidth threshold of 50 M of the transmission path, that is, larger than the bandwidth value of the LSP with the ID number of 3, so the bandwidth of the LSP with the ID number of 3 needs to be increased, instead of establishing an LSP having a bandwidth more than 60 M with a new ID number according to the prior art.

103: If it is determined that the total bandwidth value is larger than the preset bandwidth threshold of the transmission path, the RM establishes a new transmission path using an ID number of the transmission path distributed to the users, in which a bandwidth of the newly established transmission path is larger than the total bandwidth value in the converged resource reservation requests.

Methods for modifying the bandwidth of the transmission path may be selected flexibly. For example, the RM may search the MAN for another channel satisfying the total bandwidth value in the resource reservation requests, establish a new transmission path using the ID number of the original transmission path after the channel is found, and remove the original transmission path at the same time. The RM may also remove one or more transmission paths in the original channel to release the bandwidth resources, and establish a new transmission path using the ID number of the transmission path originally distributed by the system, in which the bandwidth value of the newly established transmission path is larger than the total bandwidth value in the converged resource reservation requests.

104: If it is determined that the total bandwidth value is not larger than the preset bandwidth threshold of the channel or the transmission path, or the bandwidth value of the newly established transmission path is larger than the total bandwidth value in the converged resource reservation requests, the RM returns information indicating that data is allowed to be transmitted to the users.

An implementation mode according to the above first embodiment further includes presetting the bandwidth threshold of the channel or the transmission path in the MAN before Step 102.

Figure 2:
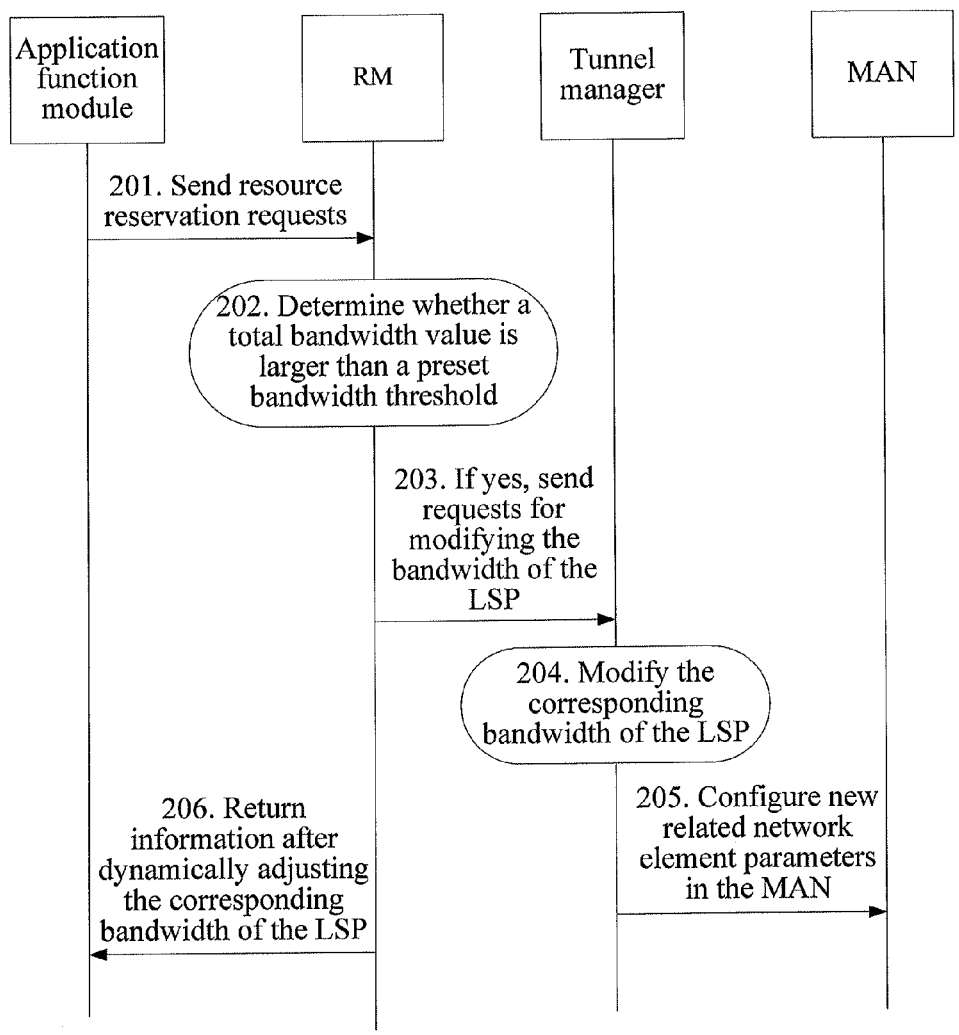
FIG. 2 is a flow chart of the implementation of the method for admission control in the MAN by using device modules in a system.

As shown in FIG. 2, the implementation of the method for admission control in the MAN provided in the above embodiment is described in detail below by using device modules in a system, which includes the following steps.

201: An application function module sends resource reservation requests to an RM through Diameter interfaces according to received session service requests from users, in which the resource reservation requests contain any one or any combination of: user name, application identifier of the application function (AF-Application-Identifier), Service-Class, Media-Component-Description, and bandwidth information of the LSP to be occupied.

202: The RM converges the resource reservation requests from the users, and determines whether a total bandwidth value in the converged resource reservation requests is larger than a preset bandwidth threshold of a transmission path.

Specifically, the RM converges the resource reservation requests from the users, that is, receives the resource reservation requests from multiple users. Instead of establishing a new LSP for each resource reservation request for service transmission at once, the RM performs a process of converging and admission control over LSPs in the MAN, distributes a transmission path in a channel to the users according to the resource reservation requests after negotiating with the network side, and obtains an ID number corresponding to the transmission path. The RM then determines whether the total bandwidth value in the converged resource reservation requests is larger than the preset bandwidth threshold of the transmission path.

203: When it is determined that the total bandwidth value is larger than the preset threshold of the transmission path, the RM controls to establish a new transmission path using the ID number of the transmission path originally distributed by the system.

The RM sends to a path manager through resource delegation interfaces control signals for dynamically adjusting the bandwidth of the transmission path, that is, requests for modifying the bandwidth of the LSP, in which the path manager may be a tunnel manager.

204: The tunnel manager receives the control signals sent by the RM, removes the transmission path originally distributed by the system, and establishes a new transmission path using the ID of the transmission path originally distributed by the system, in which the bandwidth value of the newly established transmission path is larger than the total bandwidth value in the converged resource reservation requests.

In an implementation mode, the tunnel manager may search the MAN for another channel satisfying the total bandwidth value in the resource reservation requests, establish a new transmission path using the ID number of the original transmission path after the channel is found, and remove the original transmission path at the same time.

In another implementation mode, the tunnel manager may also remove one or more transmission paths in the original channel to release bandwidth resources, and establish a new transmission path using the ID number of the transmission path originally distributed by the system, in which the bandwidth value of the newly established transmission path is larger than the total bandwidth value in the converged resource reservation requests. For example, a bandwidth of a channel 1 is 100 M, and three LSPs are provided in the channel 1, in which a bandwidth of an LSP with an ID number of 1 is 10 M, a bandwidth of an LSP with an ID number of 2 is 20 M, and a bandwidth of an LSP with an ID number of 3 is 50 M. A user originally sends data through the LSP with the ID number of 3, but now finds the bandwidth of the LSP with the ID number of 3 is insufficient if data of 60 M need to be transmitted. In this case, the system may control to remove the LSP with the ID number of 3 of insufficient bandwidth, or remove both the idle LSP with the ID number of 2 and the LSP with the ID number of 3 of insufficient bandwidth to release the bandwidth resources; and establish a new LSP having a bandwidth of 70 M with the ID number of 3, in which the bandwidth of the newly establish LSP with the ID number of 3 is larger than the total bandwidth value in the converged resource reservation requests.

205: The tunnel manager configures new related network element parameters in the MAN according to a result of modifying the bandwidth of the LSP, so as to dynamically adjust the corresponding bandwidth of the LSP between each network element.

206: The RM returns information to the application function module after dynamically adjusting the corresponding bandwidth of the LSP.

The method for admission control in the MAN provided by the above embodiment determines whether the demand of the total bandwidth value in the resource reservation requests is satisfied according to the preset bandwidth threshold of the transmission path; if not, controls to dynamically adjust the bandwidth of the transmission path by keeping the ID number of the original transmission path, so as to avoid problems of service loss, delay, and disorder during the service switching process, effectively utilize the resources of the MAN, decrease burden of the network system to compute and distribute new ID numbers for the newly established transmission paths, and ensure the QoS of the transmission thereof.

Figure 3:
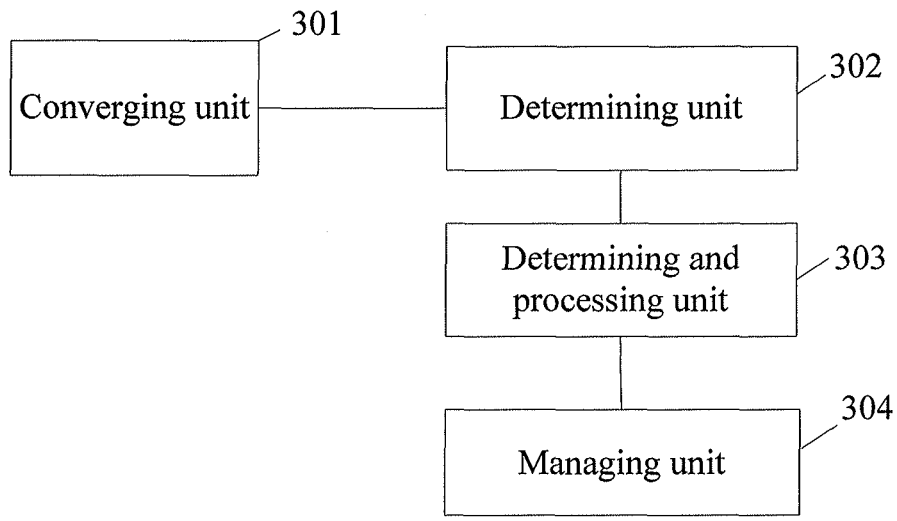
FIG. 3 is a schematic structural view of an RM according to a second embodiment of the present invention.

FIG. 3 shows an RM according to a second embodiment of the present invention, which includes a converging unit 301, a determining unit 302, a determining and processing unit 303, and a managing unit 304.

The converging unit 301 is configured to converge resource reservation requests from users, in which the resource reservation requests contain bandwidth values to be occupied for data transmission.

The determining unit 302 is configured to determine whether a total bandwidth value in the converged resource reservation requests is larger than a preset bandwidth threshold of a transmission path.

The determining and processing unit 303 is configured to, when it is determined that the total bandwidth value in the converged resource reservation requests is larger than the preset bandwidth threshold of the transmission path, establish a new transmission path using an ID number of the transmission path distributed to the users, in which a bandwidth value of the newly established transmission path is larger than the total bandwidth value in the converged resource reservation requests, and the total bandwidth value is a sum of bandwidth values to be occupied for data transmission in the converged resource reservation requests.

The managing unit 304 is configured to manage network resources on access sides and convergence sides of the users.

Figure 4:
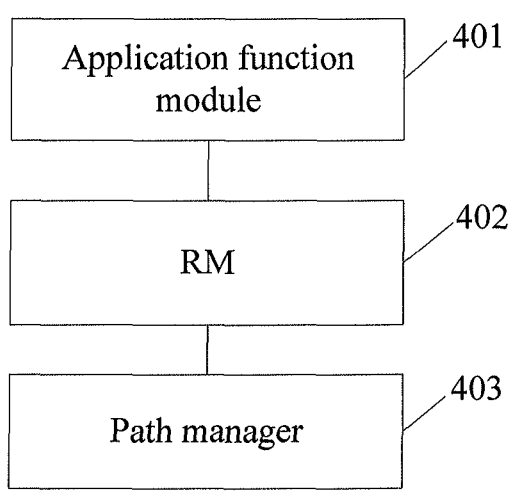
FIG. 4 is a schematic structural view of a system for admission control in a MAN according to a third embodiment of the present invention.

FIG. 4 shows a system for admission control in a MAN according to a third embodiment of the present invention, which includes an application function module 401, an RM 402, and a path manager 403.

The application function module 401 is configured to be connected to an upper application layer of the system, and send resource reservation requests to the RM through Diameter interfaces according to session service requests containing bandwidth values to be occupied for data transmission from the users, in which the resource reservation requests contain the bandwidth values to be occupied for data transmission.

The RM 402 is configured to converge the resource reservation requests from the users, and determine whether a total bandwidth value in the converged resource reservation requests is larger than a preset bandwidth threshold of a transmission path; if yes, establish a new transmission path using an ID number of the transmission path distributed to the users, in which a bandwidth value of the newly established transmission path is larger than the total bandwidth value in the converged resource reservation requests, and the total bandwidth value is a sum of bandwidth values to be occupied for data transmission in the converged resource reservation requests.

The path manager 403 is configured to be connected to the RM 402, receive control signals sent by the RM 402, and configure new network element parameters of the newly established transmission path; specifically, to remove the transmission path originally distributed to the users, and establish a new transmission path using the ID number of the transmission path originally distributed to the users.

In an implementation mode, the transmission path in the MAN refers to an LSP, and the path manager is a tunnel manager. Main functions of the RM include: converging resource reservation requests, managing resources on access sides and convergence sides; sending bandwidth modification requests of a transport convergence network to the tunnel manager, and interacting with the tunnel manager to collect topological and resource information. The tunnel manager is mainly configured to establish, remove an LSP or modify a bandwidth thereof, and to configure new related network element parameters in the MAN according to a result of modifying the bandwidth.

The system for admission control in the MAN provided by the above embodiment has a simple networking structure, and uncomplicated control algorithm. By combining dynamic admission control of the RM and the technology of transport network based on convergence, the bandwidth of the transmission path is dynamically adjusted by keeping the ID number of the original transmission path, which effectively utilizes the resources of the MAN, and ensures the QoS of the transmission thereof.

It should be noted that the above descriptions are merely preferred embodiments of the present invention, and those skilled in the art may make various improvements and refinements without departing from the spirit of the invention. All such modifications and refinements are intended to be covered by the present invention.

What is claimed is:

1. A system for admission control in a Metropolitan Area Network (MAN), comprising:
   a resource manager (RM), configured to converge resource reservation requests from users, determine whether a total bandwidth value in the converged resource reservation requests is larger than a preset bandwidth threshold of a transmission path, and if the total bandwidth value in the converged resource reservation requests is larger than the preset bandwidth threshold of the transmission path, establish a new transmission path using an identifier (ID) number of the transmission path distributed to the users,
   wherein a bandwidth value of the new transmission path is larger than the total bandwidth value in the converged resource reservation requests, the resource reservation requests contain bandwidth values to be occupied for data transmission, and the total bandwidth value comprises a sum of the bandwidth values to be occupied for data transmission in the converged resource reservation requests;
   a path manager, configured to be connected to the RM, receive control signals sent by the RM, and configure new network element parameters of the new transmission path according to the control signals; and
   an application function module, configured to be connected to the RM, and send the resource reservation requests to the RM through Diameter interfaces according to session service requests received from the users, the session service requests containing the bandwidth values to be occupied for data transmission, wherein the resource reservation requests contain the bandwidth values to be occupied for data transmission.

2. The system for admission control in the MAN according to claim 1, wherein the transmission path in the MAN comprises a label switched path (LSP), and the path manager comprises a tunnel manager.

* * * * *